US010282359B1

(12) United States Patent
Prendki et al.

(10) Patent No.: US 10,282,359 B1
(45) Date of Patent: May 7, 2019

(54) SEARCH BASED ON GROUP RELEVANCE

(71) Applicant: ATLASSIAN PTY LTD, Sydney (AU)

(72) Inventors: Jennifer Prendki, Mountain View, CA (US); Yanyi He, Sunnyvale, CA (US); Mukund Ramachandran, Sunnvyale, CA (US)

(73) Assignee: Atlassian Pty Ltd, Sydney (AU)

( * ) Notice: Subject to any disclaimer, the term of this patent is extended or adjusted under 35 U.S.C. 154(b) by 0 days.

(21) Appl. No.: 16/105,823

(22) Filed: Aug. 20, 2018

Related U.S. Application Data

(60) Provisional application No. 62/650,680, filed on Mar. 30, 2018.

(51) Int. Cl.
*G06N 20/00* (2019.01)
*G06F 16/242* (2019.01)
*G06F 16/2457* (2019.01)
*G06F 16/9535* (2019.01)

(52) U.S. Cl.
CPC ...... *G06F 16/24578* (2019.01); *G06F 16/242* (2019.01); *G06F 16/9535* (2019.01); *G06N 20/00* (2019.01)

(58) Field of Classification Search
CPC .......... G06F 17/3053; G06F 17/30389; G06F 17/30867; G06F 16/24578; G06F 16/242; G06F 16/9535; G06N 99/005; G06N 20/00
See application file for complete search history.

(56) References Cited

U.S. PATENT DOCUMENTS

| | | | |
|---|---|---|---|
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2013/0246383 A1* | 9/2013 | White | G06F 17/30867 |
| | | | 707/706 |
| 2016/0261544 A1* | 9/2016 | Conover | H04L 51/32 |
| 2018/0075147 A1* | 3/2018 | Bagheri | G06Q 50/10 |

\* cited by examiner

*Primary Examiner* — Jay A Morrison
(74) *Attorney, Agent, or Firm* — Hickman Palermo Becker Bingham LLP

(57) ABSTRACT

Techniques are presented herein for improved search based on group relevance. The techniques include determining account node groups based on the interactions of accounts with content. When a search query is received from a particular account, the group(s) associated with that account are determined, and the content items determined to be relevant to other accounts in the group(s) are given higher relevance in the search results. In some embodiments, groups are determined using partitioning and/or queries can be rewritten based on the group(s).

20 Claims, 5 Drawing Sheets

SEARCH BASED ON GROUP RELEVANCE

BENEFIT CLAIM

This application claims the benefit under 35 U.S.C. § 119(e) of provisional application 62/650,680, filed Mar. 30, 2018, the entire contents of which is hereby incorporated by reference for all purposes as if fully set forth herein.

FIELD OF THE INVENTION

The techniques described herein relate to electronic content search, and in particular to improved search based on group relevance.

BACKGROUND

A very powerful and often used feature of computer systems is the ability to search for content within the system. Many people search for information on the Internet. Many also search in the documents and other digital content on local or confined systems, including federated systems that they use at work, school, etc. When searching the digital content in any environment, people will type in search terms, and those search terms will match certain digital content. An issue with such a search is however that the proper search terms, even if inputted correctly, may bring up irrelevant documents. Further, even if the documents have some relevance, the search may not bring up the documents that are most relevant for that user.

The techniques described herein address these issues.

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

SUMMARY

The attached claims serve as a summary of the invention.

DETAILED DESCRIPTION

Figure 1:
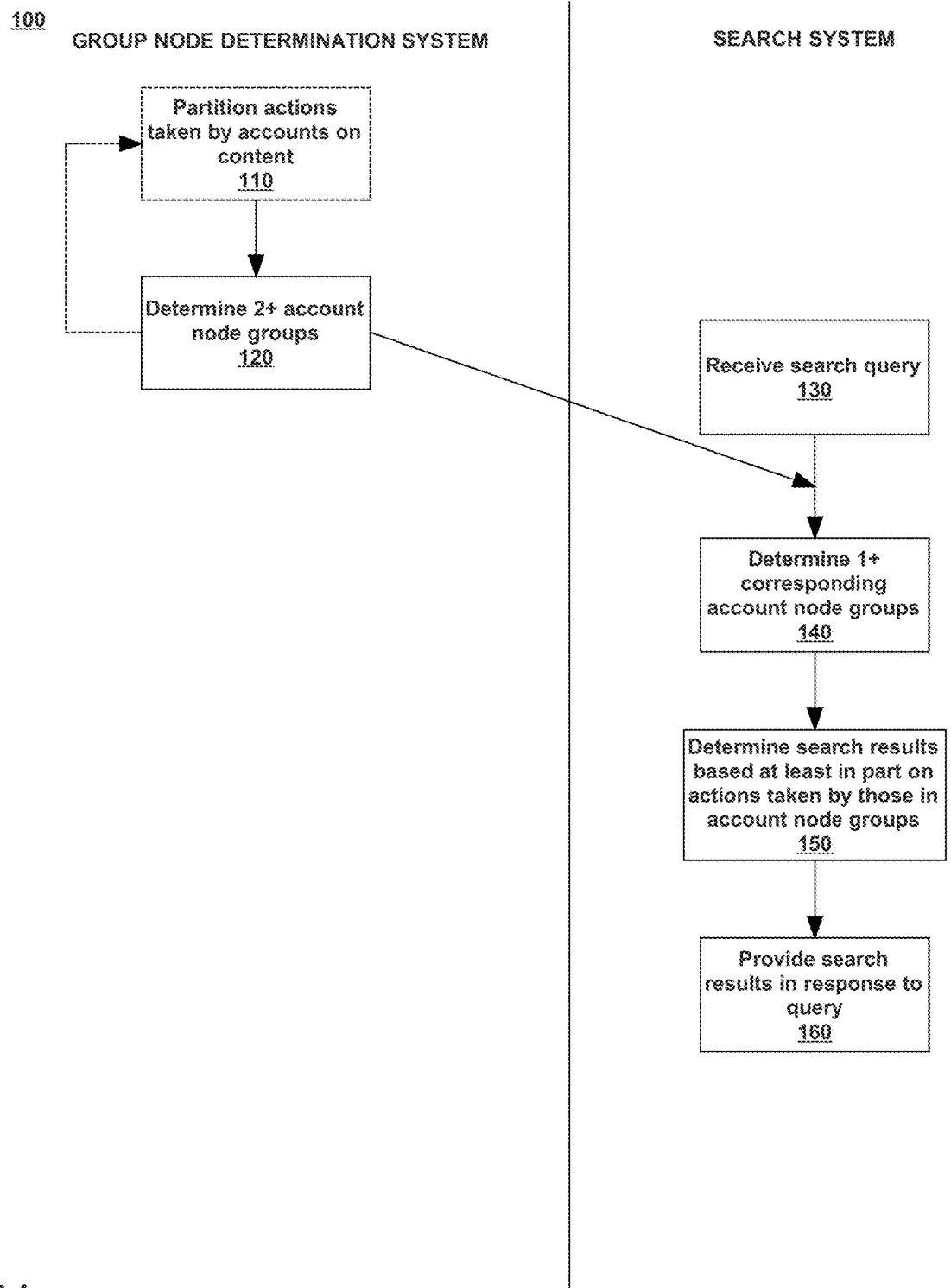
FIG. 1 depicts an example process for improved search based on group relevance.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In some embodiments, when an individual account performs a search query, the search system using the techniques herein will receive the search query and the information on the particular account. From there, it will use previously determined account node groups to determine one or more corresponding account node groups which are related to the particular account (the one that sent the search query). Based on these particular account node groups, the search system will use the account node groups to determine what digital content is the account's account node groups (e.g., content items that have been edited by, has been accessed by, etc., other accounts in those account node groups). The digital content determined as related to the account node groups will then be searched by the search system based on the received search query. In this way the digital content accessed by the account node group's accounts will be increased in weighting relevance in the search results. Increasing the relevance in the search results of the digital content previously accessed by accounts in the account node groups should improve the relevance of the search results for the particular account that made the original query. These search results are then provided in response to the query.

Consider an example where Alicia, Bob and Carole all work together on a project, Project Cronos (and are all in an account node group). Bob and Carole may have, in their work on a particular project, each searched for and clicked on a particular document that is entitled "Overview." So, when Alicia searches for the term "overview," the search system may determine that Alicia is in a group with Bob and Carole. From there, it can determine that the document entitled "Overview" has high relevance for Bob and Carole, and then provide that particular document to Alicia in response to the search for the word "overview." As may be clear from the example, when searching for a word that is used broadly such as "overview," Alicia may otherwise (if not using the techniques herein) may not have been able to find so quickly or easily the document that is relevant to Bob and Carole. Further to this example, Alicia might be part of other groups, each of those may or may not have a document entitled "Overview" that is relevant to others in those group. If there are other groups that have a relevant document entitled "Overview" then those documents may also be served in Alicia's search results. In this way, Alicia is presented with the most relevant documents with the word "overview."

In some embodiments, techniques herein use records of the actions taken by multiple user accounts on digital content items in order to determine groupings of those accounts (e.g., even if those accounts are not otherwise related by organizational chart, etc.). In the discussion herein, accounts are discussed as being represented by "white" nodes, content on which accounts take action are "black" nodes, and the edges between the white nodes and black nodes are the actions taken by the white nodes on the black nodes (e.g., an account (white node) may edit (edge connector) a document (black node). The white nodes can be partitioned using a technique such as the Louvain Modularity or other partitioning technique based on the actions taken by white nodes on black nodes. Node groups can be created based on the partitioning. The content items may be, for example, digital content associated with federated programs running on computing systems and being used by a number of accounts, such as accounts related to work. The account node groups that are determined based on the partitioning may later be used to improve the relevance of search queries, by looking at what the other accounts in associated groups of accounts have interacted with in the system. Numerous embodiments are described herein and provide many benefits, including the benefit of providing improved search results for searches when the searching account is associated with a group of other accounts. In addition to working with groups determined based on partitioning, the techniques also work with groupings made based on other factors, such as location of users associated with account nodes, organization of account nodes based on corporate organizational structures, and the like.

Example Processes for Improved Search Based on Group Relevance

FIG. 1 depicts an example process 100 for improved search based on group relevance. Process 100 optionally commences by partitioning 110 account nodes based on actions taken by those nodes (e.g. representing user accounts on a federated system) on content nodes (e.g., representing documents, chat rooms, etc.). Partitioning 110 those account nodes can include the use of any appropriate partition algorithm, including those discussed herein. The group relevance system will determine 120 two or more account node groups. If partitioning 110 was performed, then the groups will be determined 120 based on the partitioning 110. Otherwise, the groups may be determined 120 based on other factors, such as grouping based on organizational structure, project team lists, location, etc. Generally, during partitioning, accounts associated with nodes in each of the two or more groups will have interacted with similar digital content. The interactions may be searching on a particular term, clicking on a document in search results, lingering on a document for a period of time, going into a particular chat room, contributing in a chat room, responding to a message in a chat room, editing a document, commenting on a document, responding to a comment on a document, and the like. As noted by the dotted line between determining 120 and partitioning 110, the node groups may be updated periodically (e.g., every 10 minutes, 10 hours, day, week, etc.), and optional partitioning 110 and determining 120 may be repeated in each cycle.

The determined account node groups may be sent to the search system, which will receive 130 a query from an account associated with an account node. The search system will determine 140 one or more corresponding account node groups for the account from which the query was received 130. The search results are then determined 150 by the search system based at least in part on the actions taken by other accounts in the account node groups. For example, if accounts associated with an account node group have often clicked on, lingered on, edited, etc., a particular document, that document's relevance will be increased, and it will be more likely to be provided 160 as a search result and/or will be ranked higher in the search results. After determining 150 the search results, the search results are provided 160 in response to the query.

Returning to the top of process 100, actions taken by account nodes on content are optionally partitioned 110. Partitioning 110 can be performed using any appropriate method including Louvain Modularity or the Louvain Method for Community Detection. Using the Louvain Method, small communities are found by optimizing modularity locally on all the nodes. Then each small community is grouped into one node and the first step is repeated. Another approach used in various embodiments is that of Clauset, Newman, and Moore and more that finds community structure in very large networks. Further, K-means clustering may be used in some embodiments, which will partition the data space into Voronoi cells, which can then be used to determine groups.

If the account nodes have been partitioned 110, the account node groups are determined 120 based on the partitioning 110. The account node groups can be of any size. For example, a group may have just two account nodes therein, or may have tens or hundreds of account nodes. A particular account can be associated with multiple account node groups, or a single account node group. For example, a particular user named Alicia is working on Project Cronos and two other projects. For her work on Project Cronos, she also works with Bob and Carole. Alicia, Bob, and Carole all work on particular documents and in particular chat rooms for Project Cronos. Based on the interactions that all three of them have made related to Project Cronos with particular digital content, they will be partitioned together, and an account node group will be formed based on those three. This happens regardless of whether Alicia, Bob, and Carole are all in the same corporate organization, location, etc. Similar assessment will be made, and groups formed for the other projects on which Alicia works.

In some embodiments, as discussed elsewhere, the actions taken by accounts on content can be termed "white nodes" (the account nodes) acting on "black nodes" (the digital content). Generally, there will be far more black nodes than white nodes. The actions taken are the "edges" between the white nodes and the black nodes. For example, if Bob searches for the word "overview," the white node is Bob, the edge is "searches for" and the black node is the word "overview." When Bob gets back search results and clicks on the Overview document for Project Cronos, the white node is Bob, the edge is "clicks on" and the black node is the Project Cronos Overview Document. Bob may then edit the document, and the white node is Bob, the edge is the act of editing, and the black node is the Project Cronos Overview Document. Alicia and Carole may make similar actions to Bob's on the Project Cronos Overview Document. They will have corresponding white nodes and black nodes and edges. Taken together, all of these white node, edge, black node combinations are used to partition 110 the accounts. Based on the similarity and overlap of these interactions, the determination 120 can be made to place Alicia, Bob and Carol in the same group.

In some embodiments, the account node groups are determined 120 based on additional or different factors. For example, in some embodiments, the account nodes are determined 120 based on one or more of organizational structure, location, manager, etc. The account node groups would then be based on those factors. For example, an account node group may be formed based on accounts of people who report to the same manager and/or are in the same location. In some embodiments, no partitioning is done, and the account node groups are formed based on an input, such as based on one or more lists of user accounts (e.g., listing project teams) corresponding to account nodes.

The search system receives 130 a search query from a particular account, associated with a particular account node. It will then determine 140 one or more corresponding account node groups for the particular account. Determining the one or more corresponding accounts node groups may comprise accessing the two or more account node groups that were determined 120 by the group node determination system. The account may be associated with only one account node group, or it may be associated with more than one account node group.

Process 100 proceeds with the search system determining 150 search results based in part on the actions taken by accounts associated with the determined 140 account node group(s). For example, returning to the conceptualization of the white nodes and black nodes, the black nodes (content) more often interacted with by white nodes (other accounts)

in the account node groups should be served in response to the received search query. Therefore, the search system may rank the black nodes (e.g., digital content or search results) by frequency of interaction from the white nodes in the account node groups associated with the account that sent the search query. For example, search results can be determined 150 based at least in part on relevance of documents to groups of nodes associated with the particular account, as discussed elsewhere.

In some embodiments, determining 150 the search results for the search query includes weighting certain types of actions more heavily than others. For example, the action of clicking on a document may have a certain weight, and editing that document for the same black node may have a higher weight (e.g., because it indicated a more active association with the document). Further, in some embodiments, the number of times that an individual account node and/or all of the account nodes cumulatively have acted on a particular black node may increase the relevance of the search result. Relatedly, actions taken may have a reduced impact on the search results as the interaction ages. For example, if Bob edited a document within the last few days, the score it is given, and the search results may be increased. However, if Bob has not edit the document or interacted with it in over a year, it may be given a lower score in the search results.

In some embodiments, search results can be determined 150 based on other factors. For example, frequency of a term in a document may increase the ranking of a search result. A searched-for term being in the title of a document or earlier (vs. later) in the content of the document may increase the ranking of a search result. Other factors may include frequency of occurrence of searched-for terms in a document, the term being in bold or italicized text in a document.

In some embodiments, a supervised machine learning method is used to determine the ranking of the content items for the search results. For example, various content items, and related metadata (e.g., age of interaction, type of interaction, type of content item, etc.) may be used to train a supervised machine learning model. The training data for the supervised machine learning model will be content items and metadata, as well as whether the content item is a proper search results (or possibly a relevance or other scaled score for the content item). Using this training data, a supervised machine learning model is trained to determine correct weightings to use for various content items in response to a query. This machine learning model can be used to rank content items, and the rankings can then be used to determine 150 search results. In some embodiments, a machine learning model is trained for all account nodes, but in other embodiments, a machine learning model could be trained separately for groups of account nodes and/or individual account nodes. Further, as search results are generated, the actions taken on those results can be "fed back" into the machine learning model in order to improve the search results that it is presenting. For example, the machine learning model could be retrained based on the new information, such as the actions taken by the particular account on the provided 160 search results (e.g., did the account click on results, view a document, edit a document, duration of linger time, etc.). Any appropriate type of machine learning method can be used for determining search results such as a feedforward neural network, a radial basis function neural network, a Kohonen self-organizing neural network, a recurrent neural network, a convolutional neural network, a modular neural network, and/or the like.

Providing 160 the search results can include any appropriate action, including sending the search results to the device that requested the results. In some embodiments, the search results are presented in a form depicted in user interfaces 400, 500, and/or 600, which are discussed more below, and can include combining the search results from process 100 with search results from other sources.

In some embodiments, not depicted in FIG. 1, after the query is received 130 it can be rewritten based on actions taken by other white nodes in the associated account node groups. For example, if Bob and/are Carole frequently search for the word "overview" and click on the document entitled "Overview" for the Cronos Project, then when Alicia types in the search query for "over view", "ovrview", "overvriw", etc., the query can be rewritten to search for a document entitled "Overview" where the word Cronos appears (e.g., correcting the spelling of "overview" and/or adding context from the others in the group of account nodes—that it should be related to project Cronos). Further, if Alicia misspells the word Cronos as "Crons," then based on the fact that others in her account groups have searched for the word "Cronos," the misspelling can be corrected as a query rewrite.

Improved Room Suggestions Based on Group Relevance

In some embodiments, not depicted in FIG. 1, digital "rooms" may also be suggested using the techniques herein. For example, rooms, such as chat rooms or other online rooms, may be suggested based on the activity of people in your groups. The groups may be determined as discussed in process 100. In some embodiments, rooms and users may be assigned to a room matrix, where each cell in the matrix corresponds to the use by a particular user account of a particular room. The cell may have a value that represents the use of the room. For example, a "1" may represent that the particular account is a member of that particular room, and a "0" may represent that the particular account is not a member of that particular room. Groupings of accounts may be determined by whether other accounts have joined similar rooms using collaborative filtering techniques.

Rooms can then be suggested based on the groups. For example, if the user is searching for a room, then the rooms the user's account is already associated with may be compared against the rooms used by the other account nodes in its account node group(s). If the user is not already part of a particular room that others in its group(s) are a part of, then that room may be suggested to the user. Other factors used to determine what rooms to suggest are or could be based on groupings of user accounts based on location, time zone, role within a company, and the like. Similar to what is described elsewhere herein, a neural network or other machine learning model may be used to determine the weighting of the various features considered such as location etc. Further, the neural network or machine learning model may be retrained based on whether user accounts join suggested rooms (e.g., by using the choice to/not join as additional training data for the neural network or machine learning model). These techniques could be used not only to suggest additional rooms for user accounts based on the rooms used by other account nodes in your account node groups, but also suggest users to add to particular rooms (e.g., suggesting to a room administrator) or to look for room-to-room and/or user-to-user suggestions.

Figure 4:
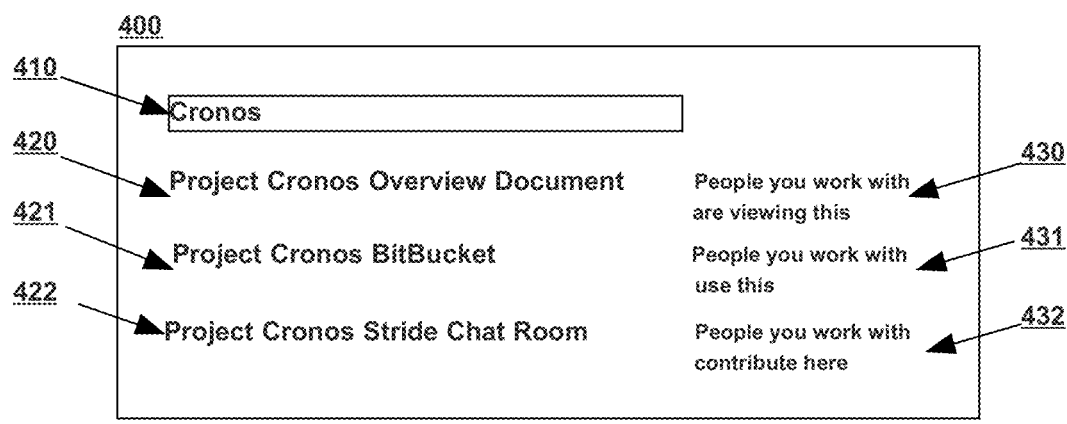
FIG. 4, FIG. 5, and FIG. 6 depict example user interfaces for improved search based on group relevance.

Example User Interfaces and Underlying Technology for Improved Search Based on Group Relevance FIG. 4 depicts a user interface 400 for improved search based on group relevance. User interface 400 includes a text input box 410. Text input box 410 may be any appropriate input mechanism, including a rendered markup language box in which a user associated with a user account can type in a search term. In some embodiments, user interface 400 also includes search results provided by process 100. Those search results may include titles and/or summaries 420, 421 and 422 as well as explanations 430, 431 and 432, which summarize why these particular search result are being displayed. Explanations 430, 431 and 432 may, for example, explain that people you work with have viewed, edited, the document, have joined the listed chat room, etc. In some embodiments, if you hover over an explanation 430, 431 or 432, it will show the accounts that have interacted with the document or provide additional information related to why the particular search result is being displayed, such as information on the grouping of nodes.

Figure 5:
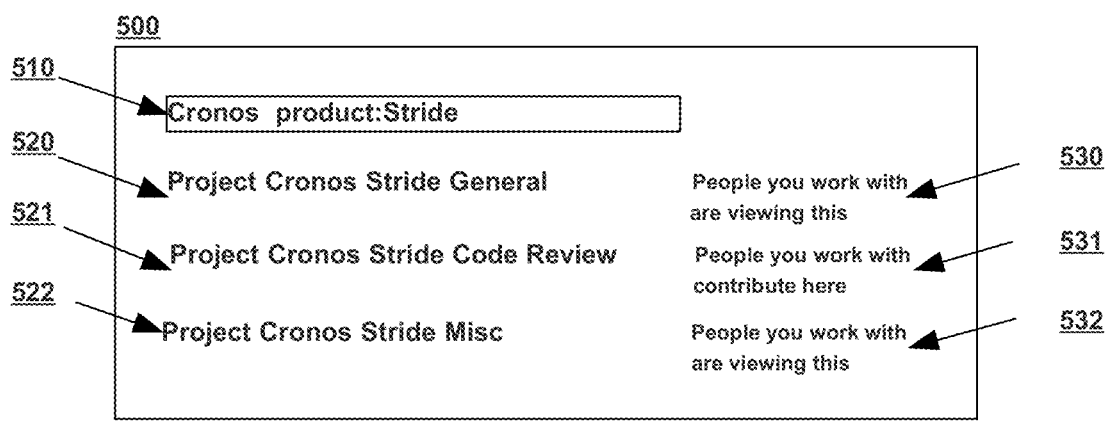

FIG. 5 depicts a user interface 500 for improved search based on group relevance. User interface 500 includes a text input box 510. Text input box 510 may be similar to text input box 410 from user interface 400. As depicted in user interface 500, text input box 510 includes both the search term "Cronos" and a product indicator "product: Stride", where Stride is a cloud-based team business communication and collaboration tool by Atlassian Corporation, PLC. When the user types in the query in box 510, the search results determined by process 100 may be limited to those using the product indication in the query. The search results 520, 521 and 522 may then be limited to those from the Stride product. Other search result limiters may also be used, such as "last modified date", "created date", "owner", and/or using any other metadata field associated with possible search results. As indicated in user interface 500 explanations of why you're receiving particular results are also included as explanations 530, 531 and 532.

Figure 6:
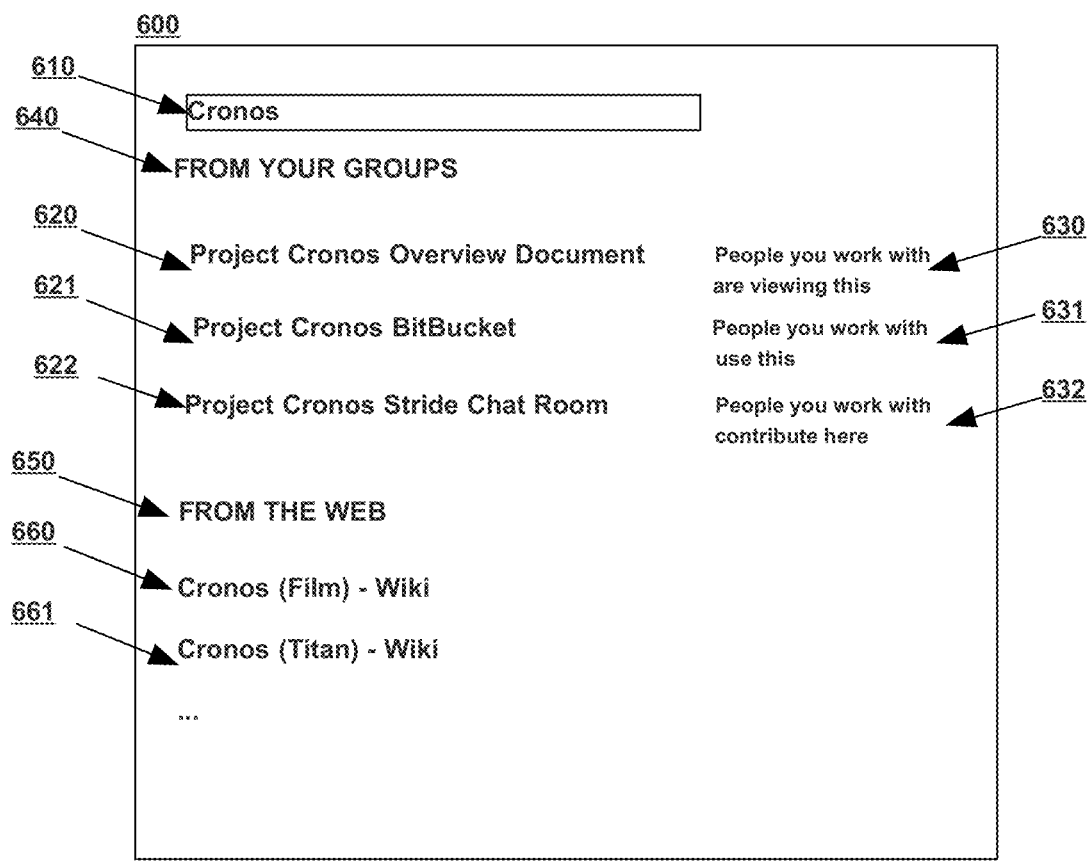

FIG. 6 depicts a user interface 600 for improved search based on group relevance. User interface 600 includes an input text box 610 into which a query can be typed. Text input box 610 may be similar and provide similar features to text input boxes 410 and 510. As depicted in user interface 600, results may be provided both from your groups (as determined, e.g., with process 100) in section 640, and from the Internet or web in section 650. Search results 620, 621 and 622 may be similar to and/or provided in a similar manner as search results 420-422 and 520-522, and may be associated with explanations 630-632 similar to explanations 430-432 and 530-532. Section 650 of user interface 600 may include results from a search of the Internet or web. The results 660 and 661 may be similar to search results that you would find in other search engines.

System for Improved Search Based on Group Relevance

Figure 2:
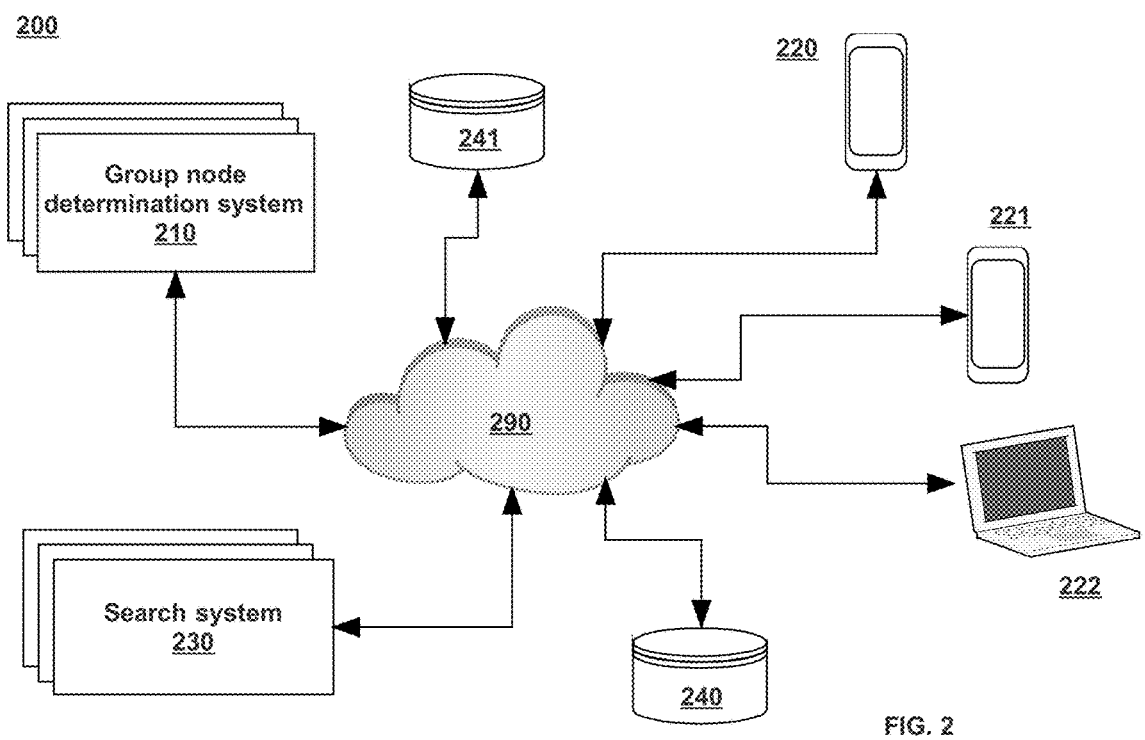
FIG. 2 depicts an example system for improved search based on group relevance.

FIG. 2 depicts an example system 200 for improved search based on group relevance. A search system 230, group node determination system 210, user devices 220, 221, 222 may all be coupled to a network 290 and be able to communicate via the network 290. Storage devices 240 and 241 are depicted as being coupled to the network 290, but they may also be coupled directly to group node determination system 210 and/or search system 230, respectively. Each storage device 240, 241 could also be coupled to network 290 or may be part of group node determination system 210 or search system 230. Each of the devices 220, 221, 222, search system 230, and group node determination system 210 may run as part of the same process and/or on the same hardware (not depicted in FIG. 2) or may run separately. Further, each may run on a single processor or computing device or on multiple computing devices, such as those discussed with respect to FIG. 3 and elsewhere herein.

As discussed elsewhere herein, the group node determination system 210 may be in communication with search system 230 and devices 220, 221, 222 in order to perform its portion of process 100. The group node determination system 210 may store the intermediary results and/or indications of groups of nodes in storage 241, or it may store these things in another location, such as in the search system 230 or storage 240. Search system 230 may store its search results in storage 240 or elsewhere. Search results may be sent via network 290 to user devices 220, 221, 222. The device 220, 221, 222 may be used to display the interfaces 400-600 and may allow for the interactions from the user accounts discussed herein.

Group node determination system 210, and/or search system 230 or other servers (not pictured here) may run federated applications with which the content items may relate. Federated application may include, but are not limited to, one or more of electronic mail servers or applications, chat servers or applications, other help ticket systems, video conferencing systems, resource control systems (e.g., a conference room booking system), blogging services, software code repositories, video content services (e.g., to show stored videos), and the like.

As discussed herein the process 100 may run in single or multiple instances, and run in parallel, in conjunction, together, or one process 100 may be a subprocess of another process 100. Further, any of the processes discussed herein, including process 100 may run on the systems or hardware discussed herein, including those depicted in FIG. 2 and FIG. 3.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
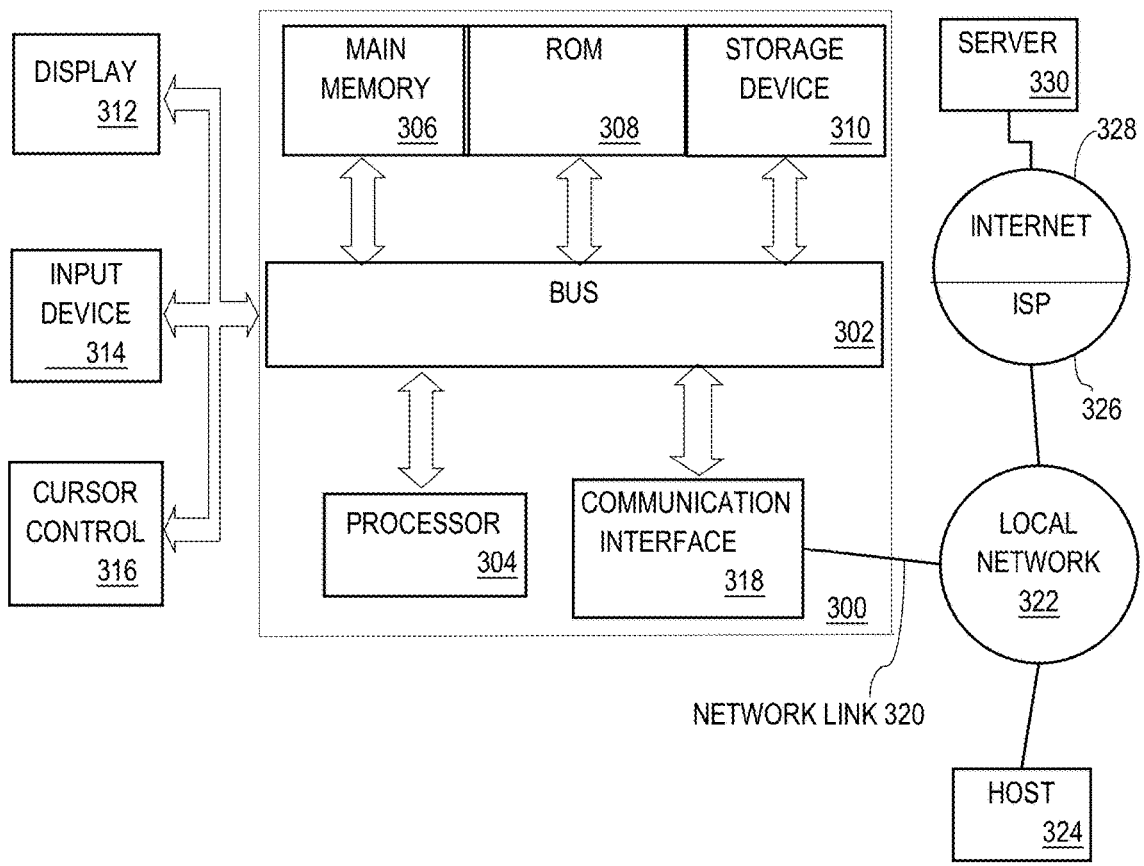
FIG. 3 depicts example hardware for improved search based on group relevance.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system, comprising:
an account node group determination system, executing using one or more computing devices, the one or more computing devices being configured to execute account node group instructions, which, when execute cause the account node group determination system to perform a first process of:
   partitioning a plurality of account nodes based on actions taken on a plurality of content items associated with a plurality of content nodes by accounts associated with the plurality of account nodes based at least in part on a Louvain Modulation calculation;
   determining two or more account node groups based at least in part on the partitioning of the plurality of account nodes, wherein a single account node of the plurality of account nodes may be included in multiple account node groups of the two or more account node groups;
a search system, executing using the one or more computing devices, the one or more computing devices being configured to execute search instructions, which, when execute cause the search system to perform a second process of:
   receiving a search query associated with a particular user account, the search query being on at least a subset of the plurality of content items, wherein the search system executes using the one or more computing devices and the particular user account has a corresponding particular user account node in the plurality of account nodes;
   determining one or more corresponding account node groups from the two or more account node groups associated with the particular user account node, wherein the one or more corresponding account node groups comprise two or more particular account nodes from the plurality of account nodes, and the two or more particular account nodes are exclusive of the particular account node, wherein the two or more particular account nodes are associated with two or more particular accounts and actions taken on two or more particular content items associated with two or more particular content nodes of the plurality of content nodes by the two or more particular accounts;
   rewriting the received search query based on at least one of one or more previous queries to produce a rewritten search query;
   determining search results for the rewritten search query based at least in part on the actions taken on particular content items based at least in part on a weighted calculation for the actions taken on the particular content items wherein different types of actions among the actions taken by the two or more particular accounts are weighted differently, the search results comprising one or more selected content items associated with one or more selected content nodes of the two or more particular content nodes, wherein weights used for the weighted calculation based on a trained machine learning model;
   providing the determined search results in response to the search query;
   receiving a user account action on the provided search results;
retraining the trained machine learning model based on the user account action to produce new weights for the weighted calculation.

2. A method, comprising:
determining, at an account node group determination system, two or more account node groups based at least in part on actions taken by a plurality of accounts, associated with a plurality of account nodes, on a plurality of content items, associated with a plurality of content nodes, wherein the account node group determination system executes using one or more computing devices;
receiving, using a search system, a search query associated with a particular user account, the search query being on at least a subset of the plurality of content items, wherein the search system executes using the one or more computing devices and the particular user account has a corresponding particular user account node in the plurality of account nodes;
determining, using the search system, one or more corresponding account node groups from the two or more account node groups associated with the particular user account node, wherein the one or more corresponding account node groups comprise two or more particular account nodes from the plurality of account nodes, and the two or more particular account nodes are exclusive of the particular account node, wherein the two or more particular account nodes are associated with two or more particular accounts and actions taken on two or more particular content items associated with two or more particular content nodes of the plurality of content nodes by the two or more particular accounts;
determining, using the search system, search results for the search query based at least in part on the actions taken on particular content items, the search results comprising one or more selected content items associated with one or more selected content nodes of the two or more particular content nodes;
providing, using the search system, the determined search results in response to the search query,
wherein the method is executed on the one or more computing devices.

3. The method of claim 2, further comprising:
determining the search results for the search query based at least in part on a weighted calculation for the actions taken by the two or more particular accounts associated with the two or more particular account nodes on the at least subset of the plurality of content items, wherein different types of actions among the actions taken by the two or more particular accounts are weighted differently.

4. The method of claim 3, further comprising determining weights for the weighted calculation based on a trained machine learning model.

5. The method of claim 4, further comprising receiving a user account action on the provided search results, and retraining the trained machine learning model based on the user account action to produce new weights for the weighted calculation.

6. The method of claim 2, further comprising:
determining the search results for the search query based at least in part on a frequency calculation for the actions taken by the two or more particular accounts associated with the two or more particular account nodes on the at least subset of the plurality of content items, wherein the more often a particular content item of the one or more selected content items has been acted on, the higher its search score, wherein higher search scores are included in the search results.

7. The method of claim 2, further comprising:
determining, using the search system, the search results for the search query based at least in part on the actions taken on particular content items, the search results comprising the one or more selected content items associated with the one or more selected content nodes, wherein the actions taken on particular content items include at least one of the group consisting of commenting on a content item, creating the content item, removing the content item, editing the content item.

8. The method of claim 2, wherein determining the two or more account node groups comprises:
partitioning, at the account node group determination system, the plurality of account nodes based on actions taken on the plurality of content items associated with the plurality of content nodes by accounts associated with the plurality of account nodes;
determining, at the account node group determination system, the two or more account node groups based at least in part on the partitioning of the plurality of account nodes.

9. The method of claim 8, wherein partitioning the plurality of account nodes into two or more account node groups comprises:
partitioning the plurality of account nodes using Louvain Modulation.

10. The method of claim 2, further comprising:
rewriting the received search query based on at least one of the one or more previous queries to produce a rewritten search query;
determining, using the search system, search results for the rewritten search query.

11. The method of claim 2, further comprising receiving the search query as a request for a digital room.

12. One or more non-transitory storage media storing instructions which, when executed by one or more computing devices, cause performance of the method recited in claim 2.

13. A system, comprising:
an account node group determination system, executing using one or more computing devices, the one or more computing devices being configured to execute account node group instructions, which, when execute cause the account node group determination system to perform a first process of:
determining two or more account node groups based at least in part on actions taken by a plurality of accounts, associated with a plurality of account nodes, on a plurality of content items, associated with a plurality of content nodes, wherein the account node group determination system executes using one or more computing devices;
a search system, executing using the one or more computing devices, the one or more computing devices being configured to execute search instructions, which, when execute cause the search system to perform a second process of:
receiving a search query associated with a particular user account, the search query being on at least a subset of the plurality of content items, wherein the search system executes using the one or more computing devices and the particular user account has a corresponding particular user account node in the plurality of account nodes;
determining one or more corresponding account node groups from the two or more account node groups associated with the particular user account node, wherein the one or more corresponding account node groups comprise two or more particular account nodes from the plurality of account nodes, and the two or more particular account nodes are exclusive of the particular account node, wherein the two or more particular account nodes are associated with two or more particular accounts and actions taken on two or more particular content items associated with two or more particular content nodes of the plurality of content nodes by the two or more particular accounts;
determining search results for the search query based at least in part on the actions taken on particular content items, the search results comprising one or more selected content items associated with one or more selected content nodes of the two or more particular content nodes;
providing the determined search results in response to the search query.

14. The system of claim 13, the second process further comprising:
determining the search results for the search query based at least in part on a weighted calculation for the actions taken by the two or more particular accounts associated with the two or more particular account nodes on the at least subset of the plurality of content items, wherein different types of actions among the actions taken by the two or more particular accounts are weighted differently.

15. The system of claim 14, the second process further comprising determining weights for the weighted calculation based on a trained machine learning model.

16. The system of claim 15, the second process further comprising receiving a user account action on the provided search results, and retraining the trained machine learning model based on the user account action to produce new weights for the weighted calculation.

17. The system of claim 13, the second process further comprising:
determining the search results for the search query based at least in part on a frequency calculation for the actions taken by the two or more particular accounts associated with the two or more particular account nodes on the at least subset of the plurality of content items, wherein the more often a particular content item of the one or more selected content items has been acted on, the higher its search score, wherein higher search scores are included in the search results.

18. The system of claim 13, the second process further comprising:
determining the search results for the search query based at least in part on the actions taken on particular content items, the search results comprising the one or more selected content items associated with the one or more selected content nodes, wherein the actions taken on particular content items include at least one of the group consisting of commenting on a content item, creating the content item, removing the content item, editing the content item.

19. The system of claim 13, wherein the first process further comprises:
partitioning, at the account node group determination system, the plurality of account nodes based on actions taken on the plurality of content items associated with the plurality of content nodes by accounts associated with the plurality of account nodes using Louvain Modulation;

determining, at the account node group determination system, the two or more account node groups based at least in part on the partitioning of the plurality of account nodes.

20. The system of claim 13, wherein the second process further comprising:
rewriting the received search query based on at least one of the one or more previous queries to produce a rewritten search query;
determining, using the search system, search results for the rewritten search query.

* * * * *